(No Model.)

J. FLINDALL.
RAILROAD RAIL JOINT.

No. 341,412. Patented May 4, 1886.

Witnesses
A. S. Paré
H. C. McArthur

Inventor
John Flindall
per H. Harrison
Attorney

UNITED STATES PATENT OFFICE.

JOHN FLINDALL, OF MORGAN PARK, ILLINOIS.

RAILROAD-RAIL JOINT.

SPECIFICATION forming part of Letters Patent No. 341,412, dated May 4, 1886.

Application filed August 22, 1885. Serial No. 175,089. (No model.)

*To all whom it may concern:*

Be it known that I, JOHN FLINDALL, a citizen of the United States, residing at Morgan Park, in the county of Cook and State of Illinois, have invented certain new and useful Improvements in Railroad-Rail Joints, of which the following is a specification, to wit:

This invention relates to railroad-rail joints; and it consists in certain peculiarities of the construction of the bolts and their fastening-nuts, substantially as will be hereinafter more fully set forth and claimed.

In order to enable others skilled in the art to which my invention appertains to make and use the same, I will now proceed to describe its construction and use, referring to the accompanying drawings, in which—

Figure 1:
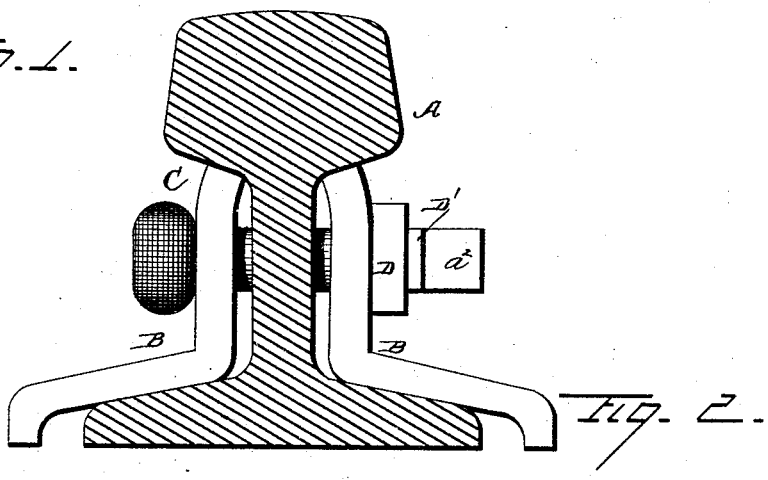
Figure 2:
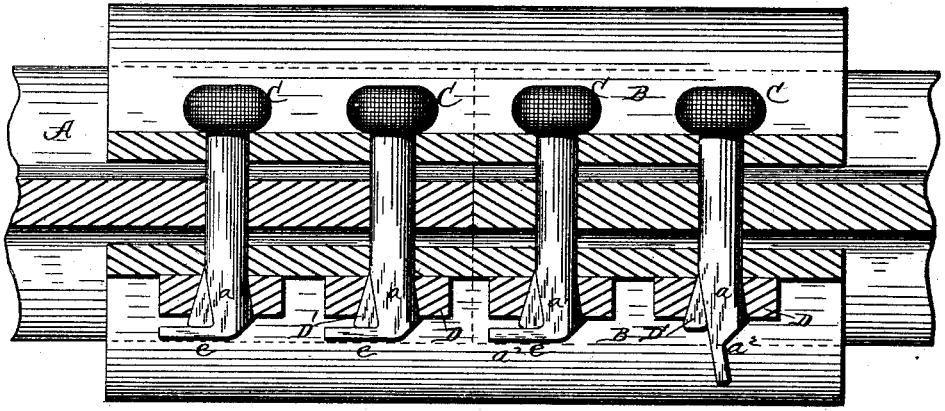
Figure 3:
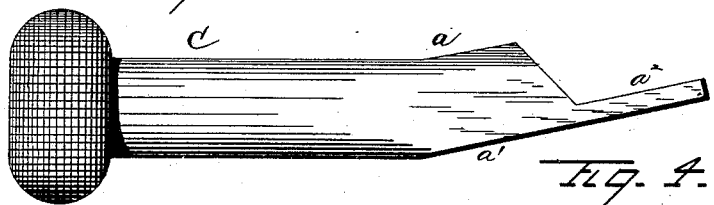
Figure 5:

Figure 1 is an end view of the joint. Fig. 2 is a horizontal section of the same; and Figs. 3, 4, and 5 are detail views of the bolt, nut, and wedge.

A represents a railroad-rail of the usual form, and B B are the fish-plates on each side of the joint. Through the plates B and the web of the rail A are passed a series of bolts or pins, C, headed on one end, as usual, but without screw-threads. The end of these bolts are bent to one side, as at $a$, beyond the fish-plate, and formed with one side flattened, as at $a'$, and the extreme point is continued in a thin web, $a^2$, as fully shown in Fig. 3.

Figure 4:
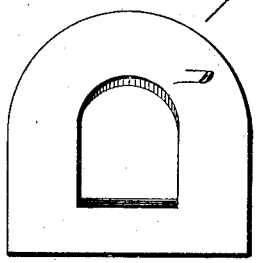

Upon the shank of the bolt is placed a nut or plate, D, having its hole $d$ beveled outward on each side, as clearly shown in Figs. 2 and 4, and a wedge-key, D', is driven into this nut, as represented.

When the joint is formed, the bolts C are passed through the rails and plates B, and the nuts D placed on their bent or angular ends, this angular portion of the bolt just fitting the bevel upon one side of the nut. The wedge D' is then slipped into the nut against the flattened side of the bolt, and the parts are tightened by a blow upon the wedge and head of the bolt at the same time. The thin point of the bolt is then bent down over the wedge, as at $e$, and the whole is secure against any possible loosening by the jar of passing trains or other accident. When the bolt is to be removed, the point is bent out and a side blow on the wedge then loosens the parts effectually.

It is obvious that instead of a nut upon each bolt, a bar may be used having beveled holes for all the bolts, exactly as described.

Having thus fully described my invention, what I claim as new, and desire to secure by Letters Patent, is—

1. In a railroad-rail joint, a bolt having its end bent at an angle and flattened on one side, in combination with a nut having an outwardly-beveled opening, and a wedge-key forced into said opening behind the bolt, substantially as and for the purpose set forth.

2. In a railroad-rail joint, a bolt having its shank bent at an angle and formed with a thin point-extension, in combination with a nut having its opening outwardly beveled, and a wedge-key driven behind the bolt and secured by bending the point-extension on it, substantially as and for the purpose set forth.

3. The bolt C, having its shank bent at an angle near its end and flattened on its rear side, and formed with a thin point-extension, substantially as shown and described.

In testimony whereof I affix my signature in presence of two witnesses.

JOHN FLINDALL.

Witnesses:
 W. C. McARTHUR,
 CHAS. KRESSMANN.